July 17, 1951  J. M. DAILY  2,561,014
OZONE GENERATOR
Filed Aug. 1, 1947  2 Sheets-Sheet 1
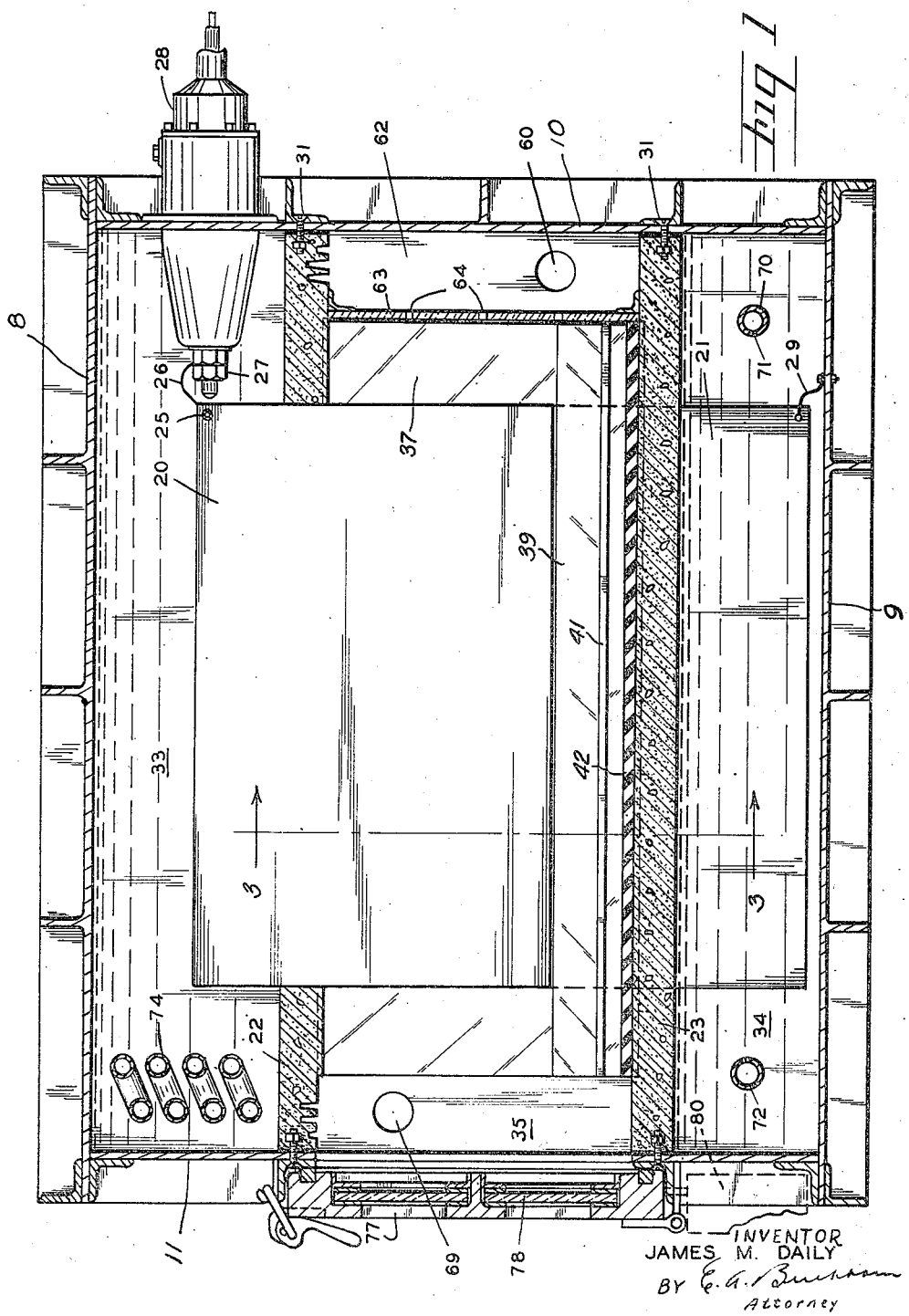
INVENTOR
JAMES M. DAILY July 17, 1951
J. M. DAILY
2,561,014
OZONE GENERATOR
Filed Aug. 1, 1947
2 Sheets—Sheet 2
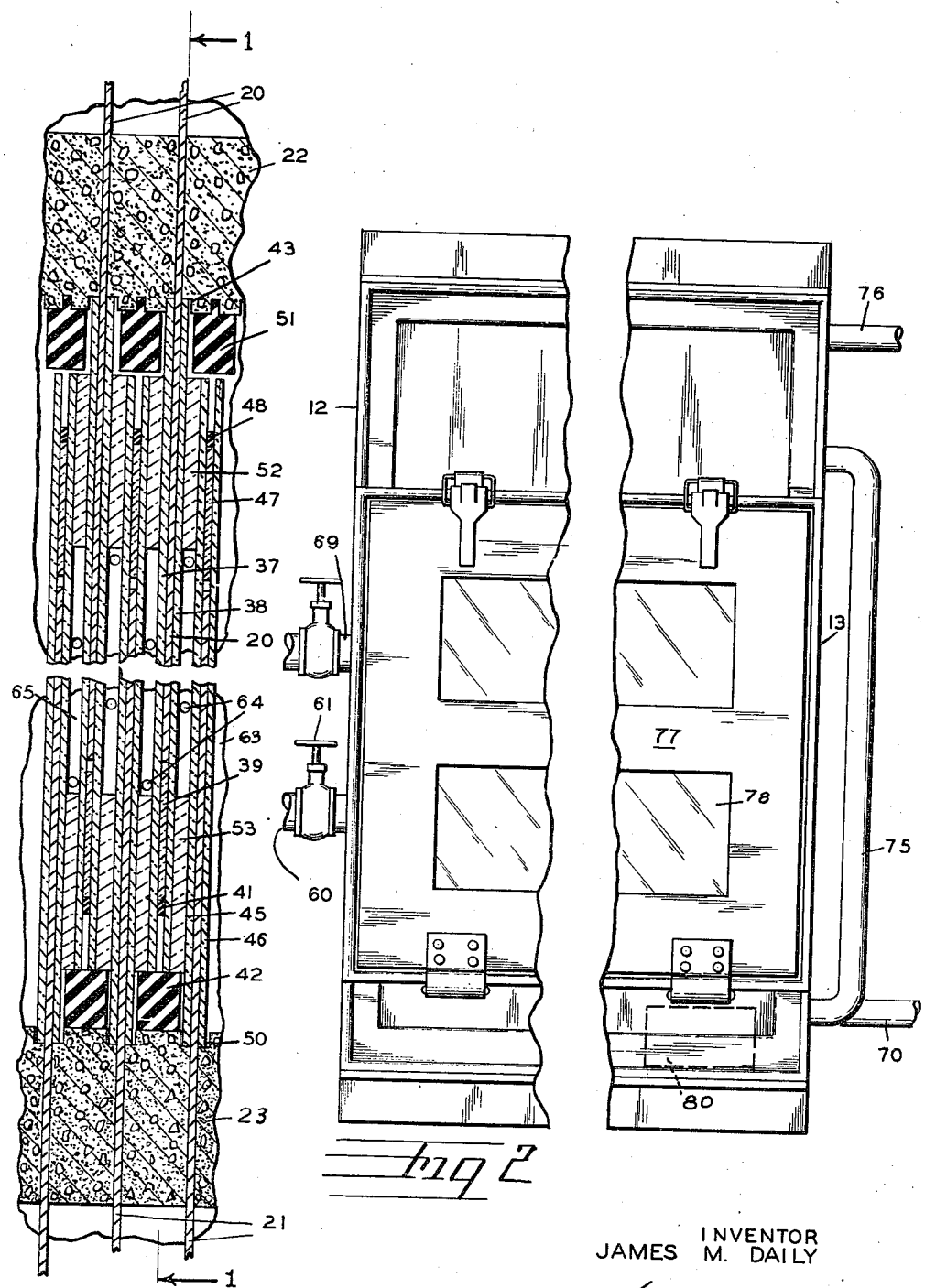
INVENTOR
JAMES M. DAILY
By E. A. Buckham
ATTORNEY Patented July 17, 1951

2,561,014

UNITED STATES PATENT OFFICE 2,561,014

OZONE GENERATOR

James Marlowe Daily, Portland, Oreg.

Application August 1, 1947, Serial No. 765,557

11 Claims. (Cl. 204—322)

The present invention relates to ozone generators and, while not necessarily limited thereto, it is particularly suitable for use in generation of ozone in large quantities for employment, for example, in the treatment of water supply or sewage.

It is well known that city water supply or sewage effluent may be satisfactorily sterilized by means of ozone, or ozonated air. In the case of purification of water supply, the ozone process has many advantages over other known methods of water treatment such as more effective sterilization without imparting an undesirable taste and, in many instances, even improving the taste qualities of the water. Wide adoption of ozone treatment processes heretofore has been handicapped by the lack of efficient ozone generating equipment, and it is a general purpose of the present invention to provide a new and improved ozone generator whereby large volumes of liquid, either water supply or sewage effluent, may be practicably and economically sterilized.

For generating ozone in large quantities, it is desirable for several reasons to construct the generators in the form of relatively small units which might be connected or disconnected in accordance with variations in demand. By automatic control equipment, the number of generator units connected in service may be controlled automatically and each unit of the entire installation thus operated with maximum efficiency. The maintenance costs of such an installation are held at a minimum since the smaller units may be serviced readily in the event of a breakdown without requiring a shutdown of the entire plant.

It is an object of the present invention, therefore, to provide a new and improved ozone generator unit which is of relatively simple, sturdy design and of low cost manufacture.

A further object of the present invention is to provide an ozone generator which is characterized by a new and improved arrangement for effecting cooling of the electrode plates.

A further object is to provide a new and improved electrode mounting arrangement for an ozone generator.

Another object of the invention is to provide a new and improved dielectric sheathing arrangement for the electrodes of an ozone generator.

A further object of the invention is to provide a new and improved air distribution arrangement for an ozone generator apparatus.

These and other objects of the invention will become more apparent as the description proceeds, taken in connection with the accompanying drawing, while the features of novelty will be pointed out with greater particularity in the appended claims.

Referring now to the drawings, in Fig. 1 is shown a cross-sectional view of my ozone generator unit and incorporating the features of the present invention; Fig. 2 is a partial front view of the ozone generator unit; and Fig. 3 is an enlarged, detailed view illustrating particularly the electrode and dielectric structure.

Referring now to the drawings, my ozone generator comprises a housing, preferably rectangular in shape, including a top wall 8, a bottom wall 9, a rear wall 10, a front wall 11, and opposite side walls 12 and 13. A pair of sets of electrodes are mounted within the casing and extend toward each other in an interleaved, or overlapping, relation with regard to each other. In order to reduce the energy requirements to a minimum when a difference of potential is applied across the electrode sets, the adjacent overlapping areas of the electrodes are covered with a suitable dielectric whereby the electrodes may be spaced closely together while at the same time the flashover level is kept at a sufficiently high value.

The two sets of electrodes 20 and 21 are shown as consisting of rectangular plates and are supported within the casing by means of the transversely extending walls 22 and 23. The electrode plates may be of any suitable ozone resistant metal, and one which also has good heat conducting properties, such as aluminum. According to the modification illustrated, the set of electrodes 20 are all connected together as indicated at 25 and connected by lead 26 to the high voltage terminal 27 mounted within the bushing 28 while the second set of electrode plates 21 connected together are in this instance shown grounded to the casing as at 29. At least the upper set of electrodes 20, or those connected to the high voltage terminal, must be supported in an electrically insulated relation with regard to the second set of electrodes and to the casing. As shown, the electrode plates 20 extend through the wall 22 and which in this instance is of a molded plastic material such as concrete. The electrode plates may be cast directly into the concrete slab as it is formed. The wall 22 is sealed around its edges in a fluidtight manner to the casing and is secured in place by means of bolts 31 extending through cooperative holes in the casing and threaded into nuts embedded in the concrete. The upper surface of the concrete slab is coated with a suitable number of layers of a sealing compound or paint and particularly adjacent the electrode surfaces.

While the electrode plates 21 are shown supported in a wall 23 similar to the wall 22 as previously described, it is to be understood that it is not essential that this wall 23 be made of insulating material inasmuch as the plates 21 are grounded in this instance. If the two sets of electrodes are to be connected to two transformer terminals, in which case the midpoint of the secondary may be grounded, then the casing may be grounded and the plates 21 connected to the second transformer terminal through a bushing similar to bushing 28. In such instance, of course, it would be necessary for the electrode plates 21 to be insulated from the casing and which may be accomplished by making the wall 23 of insulating material the same as the wall 22 as shown.

The walls 22 and 23, it will be noted, divide the interior of the casing into opposite upper and lower end compartments 33 and 34 and an intermediate compartment 35. As will be described more fully hereinafter, the end compartments 33 and 34 are cooling chambers for the sets of electrodes the ends of which project therein while the compartment 35 is the ozone generating compartment.

Referring more particularly to Fig. 3, attention is directed to the fact that the inner ends of the electrode plates terminate within the ozone generating compartment a considerable distance from the adjacent wall within which the other electrode plates are mounted. That portion of each of the electrode plates extending within the ozone generating compartment 35 is substantially inclosed within an insulating sheath of high dielectric strength in order to provide long creepage paths between electrodes of differing potentials. These sheaths may conveniently be made of two sheets of glass with a spacer therebetween at the free edge of the inclosed electrode plate. Considering first the sheath structures surrounding the high potential electrodes 20, these comprise two sheets of glass 37 and 38 which are spaced apart by an insulating strip 39 having a thickness only very slightly greater than the thickness of the inclosed electrode plate 20. The spacer strip 39 is suitably bonded to the adjacent surfaces of the glass sheets 37 and 38 and it will be observed that the spacer 39 is somewhat narrower in width than the distance between the lower edge of the electrode plate 20 and the lowermost edges of the glass plates 37 and 38 so as to form a channel between outer edge portions of the glass plates and into which may be poured a suitable sealing compound as indicated at 41 as a precautionary measure in the event of an imperfection in the bond between the adjacent surfaces of the spacer 39 and the glass sheets 37 and 38. The sheath units comprising the pairs of glass sheets 37 and 38 are supported at their lower edge upon a strip 42 of insulating material. The upper edges of the glass plates 37 and 38 extend into cooperating grooves 43 provided within the lower surface of the upper insulating wall 22 closely adjacent each of the opposite sides of the electrode plates 20. The grooves 43 are slightly wider than the thickness of the glass plates in order that the glass plates may be slid easily into position without frictional binding while, at the same time, they retain the upper portions of the glass plates relatively closely adjacent the electrode plate extending therebetween. Referring to Fig. 1, it will be observed that the glass plate 37, and hence also plate 38, extend considerably beyond each of the opposite sides of the electrode plates in order to correspondingly increase the creepage paths between the electrodes of differing potentials at the opposite ends of the ozone generating compartment.

The dielectric sheaths for the grounded electrode plates 21 are constructed similar to the sheaths for the electrode plates 20 and comprise pairs of glass plates 45 and 46 spaced apart and bonded together at their upper ends by a spacer 47 and with a quantity of sealing compound 48 provided between the outermost edge portions of the plates 45 and 46 adjacent the spacer 47 in a manner similar to that previously described.

The sheaths comprising the glass plates 45 and 46 are supported at their lower edge within grooves 50 provided adjacent each of the opposite sides of the electrode plates 21 in the bottom insulating wall 23. Elongated filler members 51, suitably secured to the upper wall 22, substantially fill the space above the sheathed electrode plates 21 for reasons as will subsequently be pointed out. The glass plates 45 and 46 are the same width as the glass plates 37 and 38 previously described and as shown in Fig. 1. In order to position the upper edge portions of the sheath units for the grounded electrode plates, suitable spacer members 52 are provided between the sheath units for the grounded electrodes and the adjacent surface of the sheath unit for the high potential electrodes. The spacer members 52 may be formed of any suitable material such as, for example, a plurality of layers of fiber glass tape wound spirally upon an elongated rigid plastic supporting strip. Spacer members 53 similar to the spacer members 52 are also provided between the adjacent sheath units in the lower region of the ozone generating compartment.

Air which is to be ozonized is forced under pressure through the inlet 60, which may be provided with a shut-off valve 61, and into the distribution chamber 62 at the rear of the intermediate or ozone generating compartment 35. A baffle plate 63 extends across the rear of the intermediate compartment 35 and immediately adjacent the rear edges of the glass plates forming the dielectric sheath units. The baffle plate 63 is formed of a suitable insulating material, such as plastic sheet, and is provided with a plurality of relatively small openings 64 therethrough permitting passage of air therethrough from the space 62 into the space between adjacent dielectric sheath units.

Since the air within the chamber 62 is under a slight pressure, flow of air through each of the openings 64 of the baffle plate 63 is assured and which air flow is properly diffused throughout the effective cross-sectional area of the spaces 65 between the opposed sheathed electrode units. It is to be understood, of course, that corona will be produced on the surfaces of the sheath units only over the areas of overlap of the electrode plates and, hence, it is desirable for maximum efficiency to restrict the air flow through the ozone generating compartment to the region of corona discharge. It will be observed that the spacer members 52 and filler strips 51 substantially close the space between the sheath units above the upper edges of the grounded electrode plates while the spacer members 53 and strips 42 substantially close the space between the sheath units below the lower edges of the electrode plate units 20. The baffle plate 63 extending across the rear end of the compartment 35 from one side wall to the other is provided with openings 64 communicating only with the passages 65 between the adjacent electrode units. The air is therefore caused to flow at substantially uniform rates between the adjacent sheaths of electrodes of differing potentials and through the zones of corona discharge. The air under the action of the corona discharge is broken down with the formation of nascent oxygen and which is then carried along with the air flow lengthwise of the ozone generating compartment and through the outlet 69.

During the operation of the ozone generator unit considerable heat will be generated within the electrode plates and an important feature of the present invention resides in the arrangement whereby the electrode plates are cooled. It will be observed that the lower end portion of the electrode plates 21 extend through the wall 23 into the lower compartment 34 and that the upper end portions of the electrode plates 20 project into the upper compartment 33. A suitable cooling medium may be circulated through both of these compartments for effecting cooling of the electrode portions extending therewithin. In this particular instance since the set of electrode plates 21 are grounded, water may be used as the cooling medium in the lower compartment 34. A source of water may be connected to the inlet pipe 70 which extends into the casing transversely thereof at the rear side of the electrode plates 21 and which is provided with openings 71 through which water may flow into the compartment 34. Water may be discharged from the lower compartment 34 by any suitable connection such as the outlet 72 extending into the compartment 34 adjacent the forward end of the casing.

Since the electrode plates 20 connected to high potential are insulated from ground, an insulating cooling medium should be used within the upper cooling compartment 33. A suitable heat exchanger 74 is provided within the forward end of the upper compartment 33 and through which some suitable cooling medium such as water may be circulated. As illustrated, the outlet 72 from the lower compartment 34 is coupled by the pipe connection 75 to the inlet for the heat exchange coil 74, the coil 74 discharging through the outlet 76.

The casing is provided with a door 77 at its forward end, the door being further provided with windows 78 through which windows the operation of the generator may be observed by virtue of the luminescence of the corona discharge. In the event of failure of one of the sheaths surrounding one of the electrode plates within the ozone generating compartment and the occurrence of an arc-over short circuiting a pair of the electrode units, the location of the arc may be noted, the apparatus disconnected from service and the defective sheath replaced with a minimum loss of time. As a precautionary measure, a relay switch unit illustrated by dotted lines 80 in Figs. 1 and 2 may be mounted upon the forward wall of the casing adjacent the door 77, which relay may be interconnected with the circuit controller for the source of high potential energy for the electrode plates 20 whereby closure of the circuit breaker will be rendered impossible while the door 77 is in the opened condition. When the door is opened, the attendant may reach into the casing and remove the defective sheath unit by sliding the same lengthwise from the casing. It is to be understood, of course, that the spacer members 52 and 53 should first be removed from the opposite sides of the particular sheath unit whereafter it may then readily be taken out for repair or replacement by a new one. Following insertion of a new sheath unit the spacer members 52 and 53 are then replaced and the door 77 reclosed for placing the unit again into service.

It will readily be understood by those skilled in the art all metal parts contacted by the ozonated air should be of some suitable ozone resistant metal, such as stainless steel. The electrode plates 20 and 21 may be made of aluminum which, while not entirely resistant to ozone, is preferred because of its good heat conduction properties. In view of the fact the dielectric sheaths are in close contact with the surfaces of the electrode plates, no appreciable corona will be formed on the surfaces of the electrode plates. The formation of corona will take place substantially entirely between the outer surfaces of adjacent sheaths.

Air to be ozonated should be substantially free of moisture, it being well known by those skilled in the art that the presence of moisture in ozonated air results in the formation of certain acids of an extremely corrosive nature. Any suitable means may be provided for drying the air to be ozonated but such means forms no part of the present invention.

It is contemplated that for the generation of ozone in large quantities for the treatment of water supply or sewage that a number of generator units be connected for parallel operation. Automatic control means may be provided for such a battery of ozone generators whereby the number of units connected in operation may be varied in accordance with the requirements for ozonated air. For operation with three-phase energy the same number of units may be connected in each leg to maintain balanced voltage conditions. Furthermore, for maintenance purposes any one of the plurality of relatively small units may be temporarily disconnected from service without requiring a shutdown of the complete battery installation. In the event of a prolonged disconnection for any one unit, another unit may be connected in substitution of the unit which is shut down. Suitable valves are thus provided in the air inlets and outlets for each unit for facilitating maintenance operations.

Having described the invention in what is considered to be a preferred embodiment thereof, it is desired that it be understood that the specific details shown and described are merely illustrated and that the invention can be carried out in various modifications, all of which are intended to be included in the scope of the appended claims.

What I claim as my invention is:

1. An ozone generator comprising a casing having an air inlet and an air outlet, a pair of sets of electrodes mounted within said casing, means supporting corresponding electrode sets by oppositely disposed ends thereof, said electrodes being of relatively large surface area, the electrodes of one set being interposed in an overlapping relation with the electrodes of the other set, adjacent electrodes of the two sets being spaced uniformly apart, dielectric sheaths extending closely adjacent each of the electrodes of the two sets, said dielectric sheaths covering the facing surfaces of each of said electrodes throughout the region of overlap with respect to the electrodes of the opposite set, said sheaths each comprising a pair of sheets bonded together along one longitudinal edge adjacent the free end of the corresponding electrode, said sheets being spaced freely apart from each other around the remaining edges whereby said sheaths are each slidably movable in transverse relation to the corresponding electrode in a direction parallel to said one longitudinal edge, and means including said sheaths defining air passages between said electrodes.

2. An ozone generator comprising a casing having an air inlet and an air outlet, a pair of sets of electrodes mounted within said casing, the electrodes of one set being interposed in an overlapping relation with the electrodes of the other set, adjacent electrodes of the two sets being spaced uniformly apart, dielectric sheaths extending closely adjacent each of the electrodes of the two sets, said sheaths each comprising a pair of sheets bonded together along one longitudinal edge adjacent the free end of the corresponding electrode, said sheets being spaced freely apart from each other around the remaining edges whereby said sheaths are each slidably movable in transverse relation to the corresponding electrode in a direction parallel to said one longitudinal edge, said dielectric sheaths covering the surface areas of each of said electrodes throughout the region of overlap with respect to the electrodes of the opposite set, means including said sheaths defining air passages between said electrodes and spaced therefrom, a baffle plate extending transversely of said casing between said air inlet and said passages, said baffle plate being provided with openings in alignment with said passages whereby air supplied through said inlet under pressure is diffused with substantially uniform distribution through said passages upon flow through said openings.

3. An ozone generator apparatus comprising a casing having an air inlet and an air outlet, a pair of sets of electrode plates mounted within said casing, said electrode plates being of relatively large surface area, the electrodes of one set being interposed in an overlapping relation with the electrodes of the other set, adjacent electrodes of the two sets being spaced uniformly apart in a parallel relation, dielectric sheaths each comprising a pair of sheets bonded together along one longitudinal edge adjacent the free end of the corresponding electrode, said pair of sheets being spaced freely apart from each other around their remaining edges whereby said sheaths are each slidably movable in transverse relation to the corresponding plate in a direction parallel to said one longitudinal edge, said dielectric sheaths covering the surface areas of each of said electrodes throughout the region of overlap with respect to the electrodes of the opposite set, a door in one side of said casing, means supporting said sheaths within said casing for slidable movement through said door.

4. An ozone generator comprising a casing having an air inlet and an air outlet, a pair of sets of electrode plates mounted within said casing, said electrode plates being of relatively large surface area, the electrode plates of each set being supported adjacent opposite ends, the free ends of said electrode plates extending toward each other in an interposed and overlapping relation with the electrode plates of the other set, adjacent electrode plates of the two sets being spaced uniformly apart in a parallel relation, dielectric sheaths covering the surface areas of each of said electrode plates throughout the region of overlap with respect to the electrode plates of the opposite set, said sheaths each comprising a pair of sheets bonded together along one edge parallel with the free end of the electrode inclosed thereby, said pair of sheets being spaced freely apart from each other around their remaining edges whereby said sheaths are each slidably movable in transverse relation to the corresponding plate in a direction parallel to said one longitudinal edge, means supporting said sheaths for slidable movement in the direction transversely of said electrode plates.

5. An ozone generator apparatus comprising a casing having an air inlet and an air outlet, a pair of sets of rectangular electrode plates mounted within said case, said plates being of relatively large surface area, the plates of each set being supported at one end and the plates of opposite sets being supported at opposite ends, said plates extending toward each other in an interposed and overlapping parallel relation with the electrode plates of the other set, said plates being spaced uniformly apart, dielectric sheaths covering the facing surface areas of each of said electrode plates throughout the region of overlap of the respective plates, said sheaths comprising a pair of sheets bonded together adjacent one edge parallel with the free end of the corresponding inclosed plate, said pair of sheets being spaced freely apart from each other around their remaining edges whereby said sheaths are each slidably movable in transverse relation to the corresponding plate in a direction parallel to said one longitudinal edge, said sheaths extending beyond the opposite sides of the corresponding electrode plate, spacer members positioned between adjacent sheaths along the opposite ends thereof and in firm engagement therewith whereby the sheets of said sheaths are held in close engagement with the respective surfaces of said plates, said spacers and adjacent sheaths defining air passages between adjacent electrode plates, said passages communicating between said inlet and said outlet.

6. An ozone generator apparatus comprising a casing, a pair of spaced apart parallel transverse walls within said casing dividing the interior thereof into three compartments, the central one being an ozone generating compartment, and cooling compartments on each of the opposite sides of said ozone generating compartment, having an air inlet and an air outlet, a pair of sets of electrode plates mounted within said casing, the electrode plates of each set being supported by a corresponding transverse wall within said casing, said electrode plates extending toward each other in said first mentioned compartment in a parallel overlapping relation with respect to the electrode plates of the other set, said cooling compartments being fluid tight with respect to said ozone generating compartment, the outer end portions of said electrode plates of one set extending through one of said walls and into the adjacent cooling compartment, the outer end portions of said electrode plates of the other one of said pair of sets extending through the other one of said transverse walls and into the adjacent cooling compartment, and means for circulating cooling medium through said cooling compartments.

7. An ozone generator apparatus comprising a casing having an air inlet and an air outlet, a pair of sets of electrode plates mounted within said casing, the electrode plates being of relatively large surface area, a pair of spaced apart parallel transverse walls extending across the interior of said casing, said air inlet and air outlet communicating with the space between said transverse walls, one of said electrode sets being wholly supported by a corresponding one of said walls, at least one of said walls being of insulating material, means for connecting the electrode set supported in said insulating wall to a source of high potential, the electrodes of said two sets extending toward each other between said walls in an interposed and overlapping relation with respect to the electrodes of the other set, dielectric sheaths extending wholly between said walls and closely adjacent each of said electrodes of said two sets, said dielectric sheaths covering the surface areas of each of said electrodes throughout the region of overlap of the respective electrodes between said two walls.

8. An ozone generator apparatus comprising a casing having an air inlet and air outlet, a pair of sets of electrode plates mounted within said casing, a pair of parallel transverse walls extending across the interior of said casing, said air inlet and said air outlet communicating with the space between said transverse walls, one of said electrode sets being supported wholly by a corresponding one of said walls, at least one of said walls supporting one of said electrode sets in an electrically insulated relation with respect to said casing and the other electrode set, means for connecting said insulated electrode set to a source of high potential, the portions of said electrodes extending between said walls being interposed in an overlapping relation, dielectric sheaths extending wholly within the space between said walls and closely adjacent each of said electrode plates, said dielectric sheaths covering the surface areas of each of said plates throughout the region of overlap with respect to adjacent electrode plates, each of said sheaths comprising a pair of sheets bonded together along one edge parallel with the free edge of the enclosed electrode plate, said sheaths being slidably supported by said walls for movement transversely of said electrode plates.

9. An ozone generator apparatus comprising a casing having an air inlet and an air outlet, a pair of sets of electrode plates mounted within said casing, a pair of parallel spaced apart transverse walls extending across the interior of said casing, said air inlet and said air outlet communicating with the space between said transverse walls, one of said electrode sets being wholly supported by a corresponding one of said walls, said electrode plates extending through the corresponding one of said walls, said electrode plates extending toward each other between said walls in a parallel spaced apart overlapping relation, at least one of said walls supporting the corresponding electrode set in an electrically insulated relation with respect to said casing and the other of said electrode sets, means for connecting said insulated electrode set to a source of high potential, dielectric sheaths extending wholly between said transverse walls and covering the surface areas of each of said electrode plates throughout the region of overlap between said walls, spacer means between adjacent dielectric sheaths defining in part air passages between adjacent sheaths and communicating between said inlet and said outlet.

10. An ozone generator apparatus comprising a casing having an air inlet and an air outlet, a pair of sets of electrode plates mounted within said casing, the electrode plates being of relatively large surface area, a pair of parallel spaced apart transverse walls extending across the interior of said casing and dividing the interior of said casing into an intermediate ozone generating compartment and opposite end compartments, said inlet and said outlet communicating with said intermediate compartment, one of said electrode sets being wholly supported by a corresponding one of said walls, the electrode plates extending in a fluid tight relation through said walls, the electrode portions between said walls extending toward each other in an interposed overlapping relation with regard to the plates of the other set, at least one of said transverse walls being of insulating material, means for connecting the electrode set mounted in said insulating wall to a source of high potential, the outer end portions of both of said pairs of electrode sets extending into the corresponding one of said end compartments, means for circulating a cooling medium through said end compartments, means defining air passages between said electrode plates extending transversely of said plates through said ozone generating compartment, a baffle plate extending across the end of said intermediate compartment between said passages and said air inlet, and said baffle plate being provided with openings communicating with said passages.

11. An ozone generating apparatus comprising a casing having an air inlet and an air outlet, a pair of sets of electrode plates mounted within said casing, a pair of parallel spaced apart transverse walls extending across the interior of said casing and dividing the interior of said casing into an intermediate ozone generating compartment and two opposite end compartments, one of said electrode sets being wholly supported by a corresponding one of said walls, said electrode sets extending in a fluid tight relation through the corresponding one of said walls, said walls consisting of a cast, electrically insulating, plastic material with the electrode plates embedded therein, the portions of said electrodes extending toward each other between said walls being interposed in an overlapping relation, dielectric sheaths extending wholly within said ozone generating compartment between said pair of walls and inclosing the portions of said electrodes extending between said walls, said sheaths defining air passages between said electrodes communicating with said inlet and said outlet.

JAMES MARLOWE DAILY.

REFERENCES CITED

The following references are of record in the file of this patent:

UNITED STATES PATENTS

| Number | Name | Date |
|---|---|---|
| 512,265 | Andreoli | Jan. 9, 1894 |
| 607,007 | Andreoli | July 12, 1898 |
| 614,500 | Ramage | Nov. 22, 1898 |
| 921,903 | Smith | May 18, 1909 |
| 955,818 | Lohman | Apr. 19, 1910 |
| 1,050,260 | Walden | Jan. 14, 1913 |
| 1,218,817 | Tennant | Mar. 13, 1917 |
| 1,316,342 | Walden | Sept. 16, 1919 |
| 1,743,202 | Forrest | Jan. 14, 1930 |
| 2,128,455 | Darling | Aug. 30, 1938 |
| 2,403,241 | Schaefer | July 2, 1946 |